US010150445B2

(12) United States Patent
Bohn et al.

(10) Patent No.: US 10,150,445 B2
(45) Date of Patent: Dec. 11, 2018

(54) FRAME FOR A VEHICLE SAFETY BELT RETRACTOR, VEHICLE STRUCTURE FOR MOUNTING A BELT RETRACTOR, AND SHEET METAL BLANK FOR A FRAME FOR A VEHICLE SAFETY BELT RETRACTOR

(71) Applicant: TRW AUTOMOTIVE GMBH, Alfdorf (DE)

(72) Inventors: Jens Bohn, Alfdorf (DE); Thomas Kielwein, Eschach (DE); Beate Pfister, Bietigheim (DE)

(73) Assignee: TRW AUTOMOTIVE GmbH (DE)

( * ) Notice: Subject to any disclaimer, the term of this patent is extended or adjusted under 35 U.S.C. 154(b) by 0 days.

(21) Appl. No.: 15/115,364

(22) PCT Filed: Jan. 19, 2015

(86) PCT No.: PCT/EP2015/000077
§ 371 (c)(1),
(2) Date: Jul. 29, 2016

(87) PCT Pub. No.: WO2015/113738
PCT Pub. Date: Aug. 6, 2015

(65) Prior Publication Data
US 2017/0008485 A1 Jan. 12, 2017

(30) Foreign Application Priority Data
Jan. 31, 2014 (DE) .................... 10 2014 001 167

(51) Int. Cl.
*B60R 22/34* (2006.01)
(52) U.S. Cl.
CPC ............ *B60R 22/34* (2013.01); *B60R 22/341* (2013.01); *B60R 2022/3402* (2013.01)

(58) Field of Classification Search
CPC ...... B60R 2022/3402; B60R 2022/286; B60R 22/341; B60R 22/34; B60R 22/28
See application file for complete search history.

(56) References Cited

U.S. PATENT DOCUMENTS 3,598,336 A * 8/1971 Frost ..................... B60R 22/353
242/382.1
4,303,209 A * 12/1981 Stephenson ............. B60R 22/44
242/372

(Continued)

FOREIGN PATENT DOCUMENTS

DE 10239740 3/2004
DE 10239740 A1 * 3/2004 ............. B60R 22/34

(Continued)

*Primary Examiner* — Keith J Frisby
(74) *Attorney, Agent, or Firm* — Tarolli, Sundheim, Covell & Tummino LLP

(57) ABSTRACT

A frame (10) for a vehicle seat belt retractor comprises a back part (12), two side legs (16) extending in parallel to each other starting from the back part (12), with a retaining aperture (18) for a belt reel being provided in each side leg (16), and a mounting structure for mounting the frame (10) fixed to the vehicle, wherein the mounting structure includes a retaining bracket (22) having a mounting hole (36) for a retaining means (50) and at least one deformable deformation element (46). Furthermore, in accordance with the invention a vehicle structure for mounting a belt retractor in a vehicle is provided comprising a body part (52) and a frame (10) according to the invention. Moreover, a sheet metal blank for such frame is provided.

18 Claims, 5 Drawing Sheets

(56) References Cited

U.S. PATENT DOCUMENTS

| | | | |
|---|---|---|---|
| 4,603,819 A * | 8/1986 | Loose | B60R 22/405 |
| | | | 242/379 |
| 5,921,495 A | 7/1999 | Doose et al. | |
| 2007/0114317 A1 | 6/2007 | Fauser | |

FOREIGN PATENT DOCUMENTS

| | | | | |
|---|---|---|---|---|
| EP | 2455262 | | 5/2012 | |
| EP | 2455262 A1 * | 5/2012 | | B60R 22/34 |
| KR | 101328079 B1 * | 11/2013 | | |

\* cited by examiner

FRAME FOR A VEHICLE SAFETY BELT RETRACTOR, VEHICLE STRUCTURE FOR MOUNTING A BELT RETRACTOR, AND SHEET METAL BLANK FOR A FRAME FOR A VEHICLE SAFETY BELT RETRACTOR

RELATED APPLICATIONS

This application corresponds to PCT/EP2015/000077, filed Jan. 19, 2015, which claims the benefit of German Application No. 10 2014 001 167.4, filed Jan. 31, 2014, the subject matter of which are incorporated herein by reference in their entirety.

BACKGROUND OF THE INVENTION

The invention relates to a frame for a vehicle seat belt retractor comprising a back part and two side legs extending in parallel to each other starting from the back part, wherein a retaining aperture for a belt reel is provided in each side leg. The invention further relates to a vehicle structure for mounting a belt retractor in a vehicle as well as a sheet metal blank for a frame of a vehicle seat belt retractor.

Belt retractors comprising a back wall the surface of which contacts the vehicle body and is mounted thereto are known from the state of the art. The side legs on which the belt reel is supported extend at right angles away from said back wall, i.e. also at right angles from the vehicle body. Such frame is made in one piece from a sheet metal with the side legs being bent at right angles with respect to the back part. For this constructional design large sheet thicknesses of more than 2 mm are required, however, so as to ensure sufficient stability of the frame.

For reducing the sheet thicknesses of such frame from the state of the art frames are known in which the back wall is offset by 90° vis-à-vis the vehicle body so that it extends away from the vehicle body. On the back wall a retaining bracket is provided which is bent so that its surface contacts the vehicle body. In addition, a retaining fitting that serves for stiffening the retractor and the retaining bracket is provided. This design helps to reduce the sheet thicknesses to 1.7 mm, wherein additional lands are required between the side legs so as to ensure the stability of this frame.

SUMMARY OF THE INVENTION

It is the object of the invention to provide a frame for a vehicle seat belt retractor that has a smaller sheet thickness and nevertheless satisfies the necessary stability requirements. It is a further object of the invention to provide a vehicle structure for mounting a belt retractor in a vehicle which has a lower weight as well as a sheet metal blank for a frame by which material-saving manufacture of a frame for a seat belt retractor is possible.

For achieving the object a frame for a vehicle seat belt retractor is provided comprising a back part, two side legs extending in parallel to each other starting from the back part, wherein a retaining aperture for a belt reel is provided in each side leg, and comprising a mounting structure for mounting the frame fixed to the vehicle, wherein the mounting structure includes a retaining bracket having a mounting hole for a retaining means and at least one deformable deformation element. The frames known from the state of the art are fully adjacent to the vehicle body. The forces occurring in a case of restraint have to be fully absorbed by the frame; therefore the latter has to be designed to be very stiff. The frame according to the invention is based on the consideration to absorb the load peaks at the beginning of the restraining operation by a deformation of the mounting structure. Only after deformation of the frame the load is completely transferred from the frame to the vehicle body. Since the deformation element is provided on the mounting structure, at the beginning of the restraining operation initially only said mounting structure but not the entire frame is deformed so that the function of the frame is maintained.

Preferably, with such frame the retaining bracket is arranged on a free edge of the back part and is bent especially at right angles relative thereto so that the surface of the back part cannot fully contact the vehicle body. Full-surface contact of the frame to the vehicle body would impair deformation of the mounting structure. When the deformation element is deformed it is also possible that the angle between the back part and the retaining bracket varies and thus the back part is bent up relative to the retaining bracket.

In order to fasten the frame additionally to the vehicle body a mounting hook especially projecting at right angles which engages in a corresponding hole on the vehicle body may be provided at the retaining bracket.

Preferably the back part, the side legs and the retaining bracket are integrally formed of a sheet metal, wherein the side legs and the retaining bracket are bent at right angles relative to the back part. Thus the frame includes as few components as possible so that simple and quick fabrication of the frame is possible. The frame may be manufactured, for example, of a punched sheet metal blank.

The deformation element may be arranged at a distance from the retaining bracket and may include a contact surface located in a plane with the retaining bracket. In this embodiment it is possible that merely the retaining bracket and the deformation element are adjacent to the vehicle body. The deformation element is arranged so that, when the webbing is tensioned, compressive formed is exerted against the vehicle body on the deformation element. The deformation element is deformed with the side legs and the back part being tilted about the retaining bracket. Consequently, in this embodiment the frame is swiveled about the retaining bracket and the first load peak is taken up by deformation of the deformation element. The deformation element may as well be configured so that it is not moved against the vehicle body and does not contact the latter before load is applied.

In order to achieve a preferably high load bearing capacity by the deformation element, the retaining bracket is preferably located at a first end of the frame and the deformation element is located at a second end. In particular, the deformation element is provided in the unwinding direction of the webbing ahead of the retaining bracket so that, when tensile force is applied to the webbing, the deformation element is forced against file vehicle body.

For preventing the side legs of the frame from contacting the vehicle body end thus fern affecting the deformation of the deformation element, the frame and especially the side legs are cot out between the retaining bracket and the deformation element. This ensures that the frame contacts the vehicle body only by the support element and the retaining bracket, i.e. the mounting structure. Especially the degree of deformation of the deformation element may also be affected by the geometry of the cutout. The deformation element may deform, for example, until the side legs or other parts of the frame contact the vehicle body, support the latter and in this way prevent or inhibit any further deformation of the deformation element.

In addition, a guide plate having a guide slot for the webbing may be provided on the frame. The guide plate is arranged, for example, on the side legs opposite to the back part so that the frame is additionally reinforced by the guide plate. The guide slot is located opposite to a plane formed by the retaining bracket, especially with respect to the retaining apertures for the belt reel, for instance with respect to the belt reel substantially radially opposite to the retaining bracket. The guide plate stiffens the frame and offers a mounting facility for the guide slot. The guide slot is spaced apart from the vehicle body so that the webbing is unwound in the case of blocking of the belt reel so that a compressive force acts on the deformation element. The guide element may be a separate component being mounted on the side legs after bending the latter. This facilitates the manufacture of a sheet metal blank, for example, as the design of the latter may be less complex.

The deformation element may be arranged on the guide plate, for instance, so that the compressive force which is exerted on the webbing and on the frame, respectively, by the webbing contacting the guide slot may act directly on the deformation element via the guide element. Especially, the deformation element is formed by a bent edge of the guide plate.

A deformation element may equally be provided between the back part and the retaining bracket. The deformation element is deformed upon swivellng the frame about the retaining bracket and in this way can equally reduce a load peak. It is in particular also imaginable that the frame merely includes said second deformation element between the back part and the retaining bracket so that, apart from the retaining bracket, no other contact point of the frame is required on the vehicle body.

In order to increase the stability of the back part and/or of the side legs embossed patterns may be provided on the same so that they exhibit higher bending stiffness.

For achieving the object, moreover a vehicle structure for mounting a belt retractor in a vehicle is provided comprising a body part and a frame according to the invention, the retaining bracket and the deformation element being assigned to the body part. At an unloaded distance the deformation element may be arranged at a distance from the vehicle body and may be moved against the latter and contact the latter only when a tensile force acts on the frame.

Preferably the deformation element is arranged in a direction of unwinding the webbing at a distance from the retaining bracket and ahead of the same so that a compressive force may act on the deformation element when a tensile force is applied to the webbing while the belt reel is blocked.

Furthermore, for achieving the object a sheet metal blank for a frame according to the invention is provided, the sheet metal blank including a back part portion, a retaining bracket portion as well as two side leg portions. The side leg portions are provided at opposed edges of the back part portions and the retaining bracket portion is provided at an edge extending between said opposed edges. Between the side leg portions a recess having dimensions larger than those of the retaining bracket portion is formed. The frame is preferably punched out of a plane sheet metal part. The sheet metal blank according to the invention permits reducing the waste when plural such sheet metal blanks are punched out. Since the recess is larger than a retaining bracket portion, the retaining bracket portion of a neighboring sheet metal blank may extend into said recess so that plural sheet metal blanks can be arranged in a very space-saving manner relative to each other on a sheet metal part.

In such sheet metal blank a mounting hook formed by a punched cutout of the back part portion is provided at the retaining bracket portion. The mounting hook is bent relative to the back part portion and the retaining bracket portion so that it projects at right angles on the back side of the frame and can be mounted in a vehicle body.

BRIEF DESCRIPTION OF THE DRAWINGS

Further advantages and features are evident from the following description in connection with the enclosed drawings. In which.

DESCRIPTION

Figure 8:
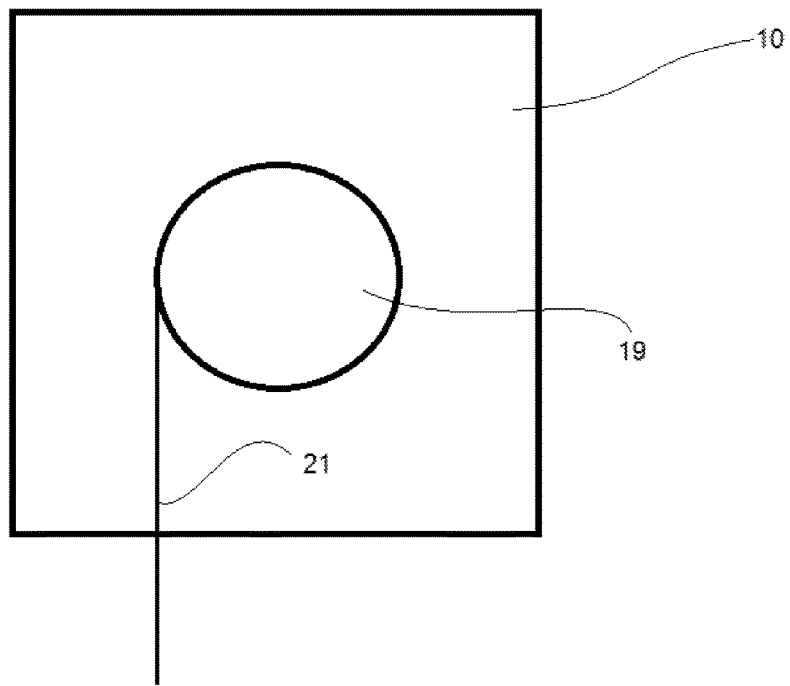

In FIGS. 1 to 5 a frame 10 for a vehicle seat belt retractor is illustrated. The frame 10 includes a back part 12 on which a side leg 16 is provided on each of opposite edges 14. Each of the side legs 16 includes a retaining aperture 18 for a belt reel 19 (FIG. 8), wherein a toothing 20 for blocking the belt reel is provided in the retaining aperture. For unwinding webbing 21 the belt reel is rotated in a direction of rotation D.

A retaining bracket 22 which is arranged at an edge 24 disposed between the edges 14 is moreover provided on the back part 12. The frame 10 in addition includes a guide plate 26 on which a guide slot 28 is provided through which the webbing of the seat belt is guided.

Figure 7:
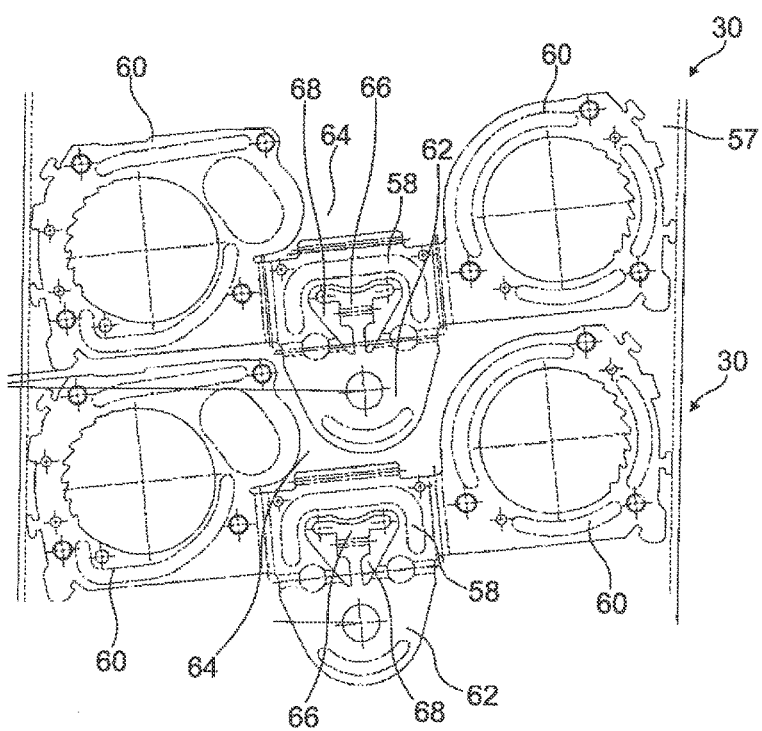
FIG. 7 shows a sheet metal strip comprising two sheet metal blanks according to the invention for the frame of FIG. 1, and FIG. 8 schematically shows the frame of FIG. 1 supporting a belt reel for webbing.

The back part 12, the side legs 16 and the retaining bracket 22 are integrally fabricated of a sheet metal blank 30 shown in FIG. 7. The side legs 16 are bent at right angles with respect to the back part 12 and extend substantially in parallel to each other away from the back part 12. The retaining bracket 22 is bent normal to the plane of the back part 12 and in the opposite direction with respect to the side legs 16 and equally extends substantially at right angles away from the back part 12.

The guide plate 26 is arranged opposite to the back part 12 at the side legs 16. As is evident especially from FIG. 2, recesses 32 through which projections 34 provided at the edge of the side legs 16 extend are arranged at the guide plate 26. The projections 34 are bent or caulked on the back side of the guide plate 26 so that the guide plate 26 is tightly connected to the side legs 16.

Figure 1:
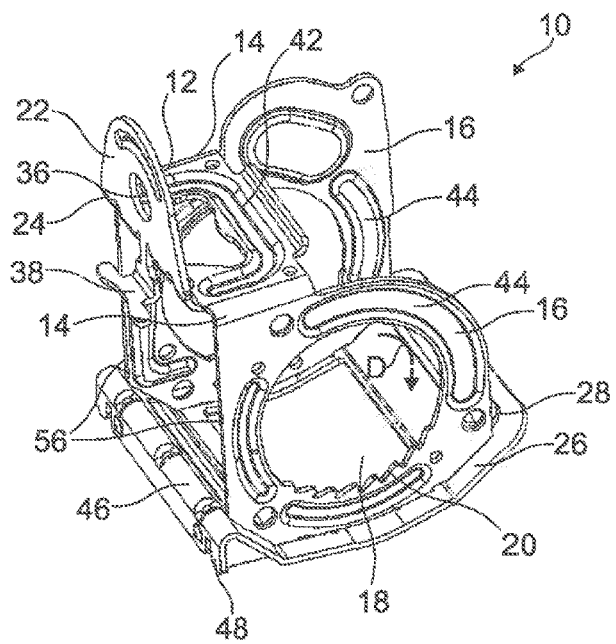
FIG. 1 shows a perspective view of a frame according to the invention.
Figure 2:
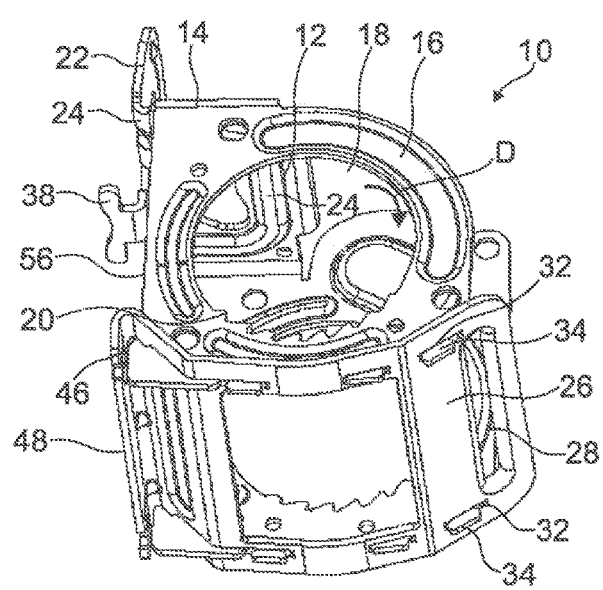
FIG. 2 shows a second perspective view of the frame of FIG. 1.
Figure 3:
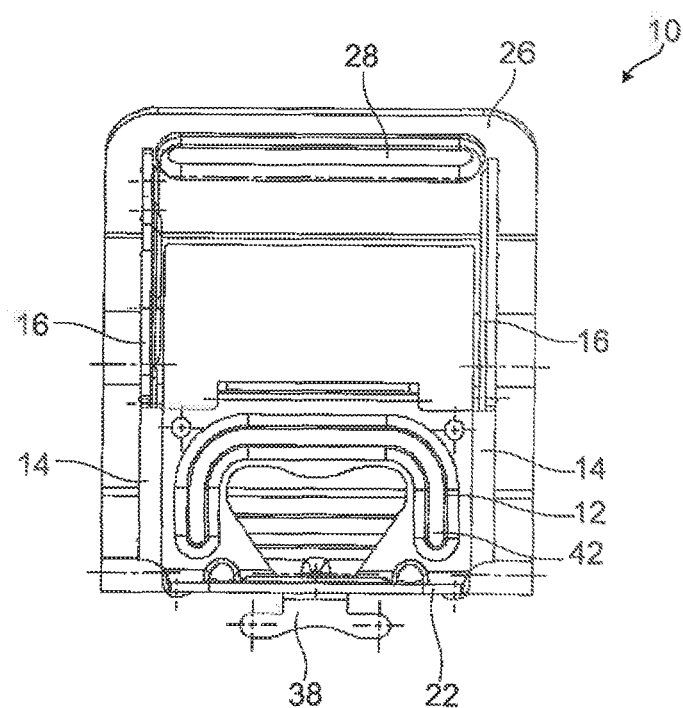
FIG. 3 is a top view onto the frame of FIG. 1.
Figure 4:
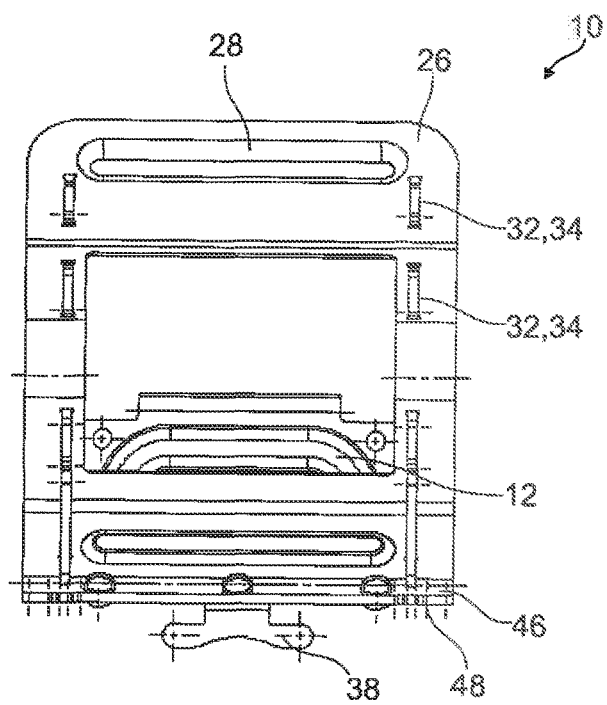
FIG. 4 is a bottom view of the frame of FIG. 1.
Figure 5:
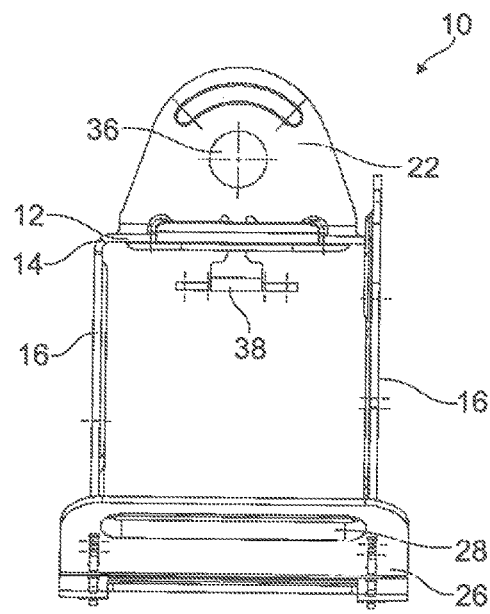
FIG. 5 is a front view of the frame of FIG. 1.

As is evident especially from FIG. 1, the retaining bracket 22 includes a mounting hole 36 for a retaining means 50 (see FIG. 6) as well as a mounting hook 38 projecting at right angles which can get caught in a body part 52, as will be explained hereinafter. The mounting hook 38 is formed by a punched cutout 68 of the back part 12.

On both the back part 12 and the side legs 16 embossed patterns 42, 44 are provided for increasing the stability of the back part 12 and the side legs 16, respectively.

Moreover, a deformation element 46 formed by a bent edge of the guide plate 26 is provided at the end of the guide plate 26 opposed to the guide slot 28. The deformation element includes a contact surface 43 that is arranged in a plane including the retaining bracket 22, as is visible especially from FIG. 6.

The deformation element 46 forms a mounting structure for the frame 10 together with the retaining bracket 22.

Figure 6:
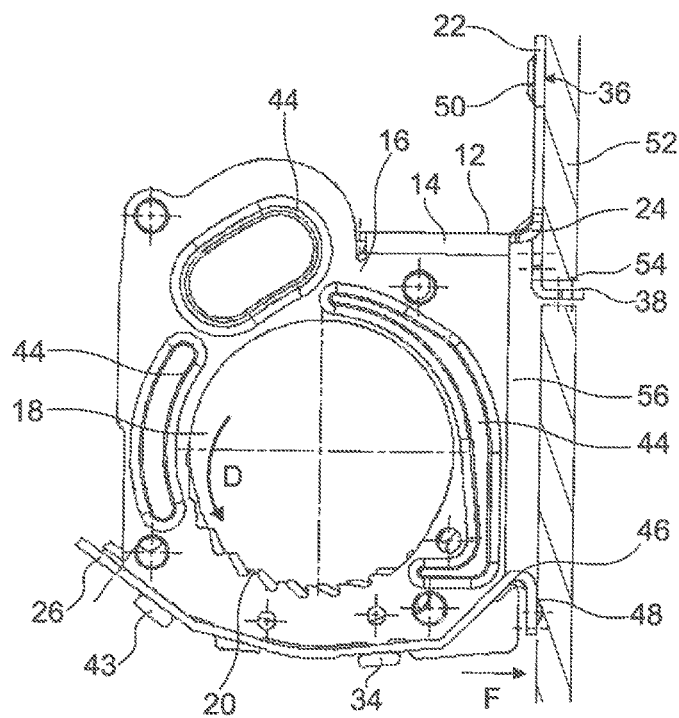
FIG. 6 shows a side view of a vehicle structure according to the invention comprising the frame of FIG. 1.

As can be seen in FIG. 6, the frame 10 is attached to a body part 52 by a retaining means 50 extending through the retaining bracket 22. The mounting hook 38 extends into an aperture 54 at the body part 52 and is fixed within the same. The deformation element 46 contacts the body part 52 with the contact surface 48 but is not fixed thereto.

As the guide slot 28 of the guide plate 26 is arranged opposite to a plane formed by the retaining bracket 22 with respect to the retaining apertures 18, the webbing is guided out of the frame 10 at a distance from the body part 52.

When a tensile force is exerted on the webbing with the belt reel being blocked, it acts vertically downwards, related to FIG. 6. Since the belt reel is fixed to the body part 52 by the retaining bracket 22 and by virtue of the distance of the guide slot 28 from the body part 52 a compression force F directed substantially perpendicularly against the body part 52 acts on the deformation element 46 and, respectively, on the contact surface 48. Upon blocking of the belt reel this compression force F first causes the deformation element 46 to be deformed with the frame 10 being tilted about the retaining bracket 22. This deformation helps to reduce the first load peak upon blocking of the belt reel so that lower load acts on the frame 10 and is transmitted to the body part 52 via the retaining means 50.

Other than with the frames known from the state of the art, part of the force acting on the frame 10 via the webbing is reduced through deformation of the frame 10 and, resp., of the mounting structure of the frame 10. Since the other components of the frame 10 in this way have to absorb lower load, they may be configured to be thinner. Especially the sheet thickness may be reduced to 1.5 mm. As moreover a deformation of the frame 10 is desired, the latter need not be so stiff that it cannot deform.

As is evident especially from FIG. 6, the deformation element 48 is arranged at a distance from the retaining bracket 22, with the retaining bracket 22 being arranged in particular on a first end of the frame 10 and the deformation element 46 is arranged on a second end of the frame 10. Due to this large distance between the retaining bracket 22 and the deformation element 46, the force F can act on the deformation element 46 with an as large lever arm as possible so that the deformation element may be designed to be stiffer and may reduce higher load.

Furthermore a recess 56 is formed at each of the side legs 16 between the retaining bracket 22 and the deformation element 46. These recesses 56 prevent the side legs 16 from contacting the body part 52 and thus from inhibiting deformation of the deformation element 46. In particular, the recesses 56 may be configured so that after defined deformation of the deformation element 46 the side legs 16 contact the body part 52 and prevent or inhibit further deformation of the deformation element 46.

By deforming the deformation element 46 and tilting the frame 10 also the back part 12 is bent relative to the retaining bracket 22. For example, between the retaining bracket 22 and the back part 12 a second deformation element may be provided which is equally deformed by such bending-up. Said second deformation element may equally reduce a load peak by the deformation.

Depending on the design of the frame 10 and, resp., of the vehicle structure, it is also possible that the lower end of the frame 10 with respect to FIG. 6 does not contact a vehicle body 52. In such embodiment also merely a second deformation element may be provided between the retaining bracket 22 and the back part 12.

In particular, the deformation element 46 of the mounting structure may be arranged at any position on the frame 10. It has merely to be ensured that, when a tensile force acts on the frame 10, the deformation element 46 is deformed by tilting, rotating, swiveling or displacing the frame 10.

As already afore-explained, the frame 10 is manufactured of a plane sheet metal blank 30 as well as the guide plate 26. FIG. 7 illustrates an example of such sheet metal blank 30 showing a sheet metal part 57 including several sheet metal blanks 30.

The sheet metal blank 30 comprises a back part portion 58, two side leg portions 60 and a retaining bracket portion 62. The side leg portions 60 are provided on opposite edges at the back part portion 58, the retaining bracket portion 82 is located on an edge disposed between the opposite edges. The side leg portions 60 mostly extend in a direction opposed to the retaining bracket portion 62 so that a recess 64 is formed between the former.

The dimensions of this recess 64 are larger than the dimensions of the retaining bracket portion 62. In this way, as is evident from FIG. 7, the retaining bracket portion 62 of an adjacent sheet metal blank 30 may be arranged in the recess 64. The side leg portions 60 of adjacent sheet metal blanks 30 and, hence, the adjacent sheet metal blanks 30 in this way can be arranged very closely to each other, thus enabling the sheet metal blanks 30 to be arranged on the sheet metal part 57 in a material-saving manner. The waste of material can be reduced, which allows achieving better utilization of material.

As is visible especially in FIG. 7, on the retaining bracket portion 62 a mounting hook portion 66 formed by a punched cutout 68 of the back part portion 58 is provided. In this way, the mounting hook 38 may be formed integrally with the retaining bracket 22 so that it is connected to the retaining bracket 22 in a more stable manner.

The invention claimed is:

1. A frame (10) for a seat belt retractor comprising a back part (12), two side legs (16) extending in parallel to each other starting from the back part (12), with a retaining aperture (18) for a belt reel being provided in each side leg (16), and comprising a mounting structure for mounting the frame (10) fixedly to a vehicle, wherein the mounting structure includes a retaining bracket (22) including a fixing hole (36) for a retaining means (50) and at least one deformation element (46) adapted to deform to reduce load transfer from the frame to the vehicle via the retaining means when the belt reel is blocked, the deformation element being arranged at a distance from the retaining bracket and including a contact surface in contact with the vehicle, the contact surface being coplanar with the retaining bracket,
wherein the retaining bracket (22) is arranged on a free edge (24) of the back part (12) and is bent relative to the latter, and wherein the back part (12), the side legs (16) and the retaining bracket (22) are integrally made of a sheet metal, wherein the side legs (16) and the retaining bracket (22) are bent at right angles relative to the back part (12).

2. The frame according to claim 1, wherein a mounting hook (38) is provided on the retaining bracket (22).

3. The frame according to claim 2, wherein the mounting hook projects at right angles.

4. The retaining bracket according to claim 1, wherein the retaining bracket (22) is located on a first end of the frame (10) and the deformation element (46) is located on a second end.

5. The frame according to claim 1, wherein the frame (10) cut out between the retaining bracket (22) and the deformation element (46).

6. The frame according to claim 5, wherein the side legs are cut out between the retaining bracket and the deformation element.

7. The frame according to claim 1, wherein a guide plate (26) having a guide slot (28) for a webbing is provided, wherein the guide plate (26) is arranged on the side legs (16) opposite to the back part (12) and the guide slot (28) is opposed to a plane formed by the retaining bracket (22) with respect to the retaining aperture (18) for the belt reel.

8. The frame according to claim 7, wherein the deformation element (46) is arranged on the guide plate (26).

9. The frame according to claim 8, wherein the deformation element is formed by a bent edge of the guide plate.

10. The frame according to claim 1, wherein a second deformation element is provided between the back part (12) and the retaining bracket (22).

11. The frame according to claim 1, wherein embossed patterns (42, 44) are provided on the back part (12) and/or on the side legs (16).

12. A vehicle structure for mounting a belt retractor in a vehicle comprising a body part (52) and a frame (10) according to claim 1, wherein the retaining bracket (22) and the deformation element (46) are assigned to the body part (52).

13. The vehicle structure according to claim 12, wherein the deformation element (46) is arranged in an unwinding direction of a webbing at a distance from the retaining bracket (22) and ahead of the latter.

14. A sheet metal blank (30) for a frame (10) according to claim 1, wherein the sheet metal blank (30) includes a back part portion (58), a retaining bracket portion (62) and two side leg portions (60), wherein the side leg portions (60) are provided on opposite edges of the back part portion (58) and the retaining bracket portion (62) is provided on an edge of the back part portion (58) extending between the edges and wherein a recess (64) the dimensions of which are larger than those of the retaining bracket portion (62) is formed between the side leg portions (60).

15. The sheet metal blank according to claim 14, wherein a mounting hook (38) formed by a punched cutout (68) of the back part portion (58) is provided on the retaining bracket portion (62).

16. The frame according to claim 1, wherein the retaining bracket is bent at right angles relative to the back part.

17. A frame (10) for a seat belt retractor comprising a back part (12), two side legs (16) extending in parallel to each other starting from the back part (12), with a retaining aperture (18) for a belt reel being provided in each side leg (16), and comprising a mounting structure for mounting the frame (10) fixedly to a vehicle, wherein the mounting structure includes a retaining bracket (22) including a fixing hole (36) for a retaining means (50) and at least one deformation element (46), the deformation element being adapted to deform by a compressive force exerted on the vehicle when the belt reel is blocked to reduce load transfer from the frame to the vehicle via the retaining means, wherein the retaining bracket (22) is arranged on a free edge (24) of the back part (12) and is bent relative to the latter, and wherein the back part (12), the side legs (16) and the retaining bracket (22) are integrally made of a sheet metal, wherein the side legs (16) and the retaining bracket (22) are bent at right angles relative to the back part (12).

18. A frame (10) for a seat belt retractor comprising a back part (12), two side legs (16) extending in parallel to each other starting from the back part (12), with a retaining aperture (18) for a belt reel being provided in each side leg (16), and comprising a mounting structure for mounting the frame (10) fixedly to a vehicle, the retaining aperture having toothing for engaging the belt reel to block rotation of the belt reel, the mounting structure including a retaining bracket (22) including a fixing hole (36) for a retaining means (50) and at least one deformation element (46) adapted to deform to reduce load transfer from the frame to the vehicle via the retaining means when the belt reel is blocked, wherein the retaining bracket (22) is arranged on a free edge (24) of the back part (12) and is bent relative to the latter, and wherein the back part (12), the side legs (16) and the retaining bracket (22) are integrally made of a sheet metal, wherein the side legs (16) and the retaining bracket (22) are bent at right angles relative to the back part (12).

* * * * *